United States Patent
Kapadia et al.

(10) Patent No.: US 9,699,066 B2
(45) Date of Patent: *Jul. 4, 2017

(54) SYSTEM AND METHOD FOR ENABLING CONVERSATIONAL LEARNING IN A NETWORK ENVIRONMENT

(71) Applicant: CISCO TECHNOLOGY, INC., San Jose, CA (US)

(72) Inventors: Shyam Kapadia, San Jose, CA (US); Vrishabha Sikand, Lexington, MA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/280,612

(22) Filed: Sep. 29, 2016

(65) Prior Publication Data

US 2017/0041212 A1  Feb. 9, 2017

Related U.S. Application Data

(63) Continuation of application No. 14/448,820, filed on Jul. 31, 2014, now Pat. No. 9,485,115.

(60) Provisional application No. 61/983,395, filed on Apr. 23, 2014.

(51) Int. Cl.
*H04L 12/26* (2006.01)
*H04L 12/751* (2013.01)
*H04L 12/44* (2006.01)

(52) U.S. Cl.
CPC .............. *H04L 45/08* (2013.01); *H04L 12/44* (2013.01); *H04L 45/02* (2013.01)

(58) Field of Classification Search
CPC ....................................................... H04L 45/02
See application file for complete search history.

(56) References Cited

U.S. PATENT DOCUMENTS

| | | | |
|---|---|---|---|
| 9,485,115 B2 * | 11/2016 | Kapadia | .............. H04L 45/02 |
| 2008/0084888 A1 | 4/2008 | Yadav | |
| 2013/0182604 A1 | 7/2013 | Moreno et al. | |
| 2013/0235881 A1 | 9/2013 | Sharma | |
| 2013/0246652 A1 | 9/2013 | Liu et al. | |
| 2013/0329730 A1 | 12/2013 | Zhang et al. | |
| 2014/0023074 A1 | 1/2014 | Mishra | |
| 2014/0092901 A1 | 4/2014 | Kapadia et al. | |
| 2014/0098823 A1 | 4/2014 | Kapadia et al. | |
| 2014/0112122 A1 | 4/2014 | Kapadia et al. | |
| 2014/0169368 A1 | 6/2014 | Grover et al. | |
| 2015/0304210 A1 | 10/2015 | Lin | |
| 2015/0312134 A1 | 10/2015 | Kapadia et al. | |
| 2015/0341220 A1 | 11/2015 | Sikand | |

\* cited by examiner

*Primary Examiner* — Kevin C Harper
(74) *Attorney, Agent, or Firm* — Patent Capital Group

(57) ABSTRACT

A system and a method for providing conversational learning is implemented in a network environment. An exemplary method includes receiving a subnet route advertisement that includes an attribute that triggers glean behavior for routing decisions; and installing a subnet entry in a Forwarding Information Base/Adjacency (FIB/ADJ) table. The subnet entry includes a subnet associated with the subnet route advertisement and a corresponding glean adjacency. The corresponding glean adjacency is configured to trigger installation of a host entry associated with a host in an active conversation in a network.

17 Claims, 5 Drawing Sheets

SYSTEM AND METHOD FOR ENABLING CONVERSATIONAL LEARNING IN A NETWORK ENVIRONMENT

CROSS-REFERENCE TO RELATED APPLICATION

This application is a continuation (and claims the benefit of priority under 35 U.S.C. §120) of U.S. application Ser. No. 14/448,820, filed on Jul. 31, 2014, entitled "SYSTEM AND METHOD FOR ENABLING CONVERSATIONAL LEARNING IN A NETWORK ENVIRONMENT," Inventors Shyam Kapadia, et al., which application claims the benefit of priority under 35 U.S.C. §119(e) to U.S. Provisional Patent Application Ser. No. 61/983,395, entitled "METHOD AND SYSTEM FOR OPTIMIZING TRAFFIC IN DYNAMIC FABRIC AUTOMATION LIKE MASSIVELY SCALABLE DATA CENTER ENVIRONMENTS" filed Apr. 23, 2014. The disclosure of the prior applications are considered part of (and are incorporated by reference into) the disclosure of this application.

TECHNICAL FIELD

This disclosure relates in general to the field of communications and, more particularly, to a system and a method for enabling conversational learning in a network environment.

BACKGROUND

Data centers are increasingly used by enterprises to achieve collaboration, store data, manage resources, etc. A typical data center network contains myriad network elements. The network connecting the network elements provides secure user access to data center services and an infrastructure for deployment, interconnection, and aggregation of shared resource as required, including applications, servers, appliances, and storage. Improving operational efficiency and optimizing utilization of data center resources are some of the challenges facing data center managers. Data center managers want a resilient infrastructure that consistently supports diverse applications and services and protects the applications and services against disruptions. A properly planned and operating data center network provides application and data integrity and, further, optimizes application availability and performance.

BRIEF DESCRIPTION OF DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A system and a method for providing conversational learning is implemented in a network environment. An exemplary method includes receiving a subnet route advertisement that includes an attribute that triggers glean behavior for routing decisions; and installing a subnet entry in a Forwarding Information Base/Adjacency (FIB/ADJ) table. The subnet entry includes a subnet associated with the subnet route advertisement and a corresponding glean adjacency. The corresponding glean adjacency is configured to trigger installation of a host entry associated with a host in an active conversation in a network. The method can further include forwarding a packet between a host connected to the network and an external host connected to the network over an external network such that the packet traverses the network via a one-hop route. In specific embodiments, the FIB/ADJ table can be implemented in hardware, where software installs the host entry associated with the host in the active conversation in the FIB/ADJ table. In some embodiments, the route advertisement is a direct subnet connection redistributed into a routing protocol (e.g., internal border gateway protocol (iBGP)) having the attribute (e.g., extended community attribute) attached thereto.

In various embodiments, the method includes receiving a packet for a destination host associated with a particular subnet (for example, from an external host); and installing a host entry for the destination host to the FIB/ADJ table upon determining that the particular subnet matches the subnet of the subnet entry in the FIB/ADJ table. The host entry can include a host IP address of the destination host and a corresponding adjacency to a network element anchoring the destination host to the network. The method can further include forwarding the packet to the destination host such that the packet traverses the network via a one-hop route.

In various embodiments, the network includes a leaf switch for connecting a host to the network and a border leaf switch that connects an external host to the network over an external network. The border leaf switch can receive the subnet advertisement from the leaf switch, and install the subnet entry in the FIB/ADJ table. The border leaf switch can include the FIB/ADJ table and a routing information base (RIB) table, and the border leaf switch can be configured to trigger the RIB table to install the host entry in the FIB table.

Example Embodiments

Figure 1:
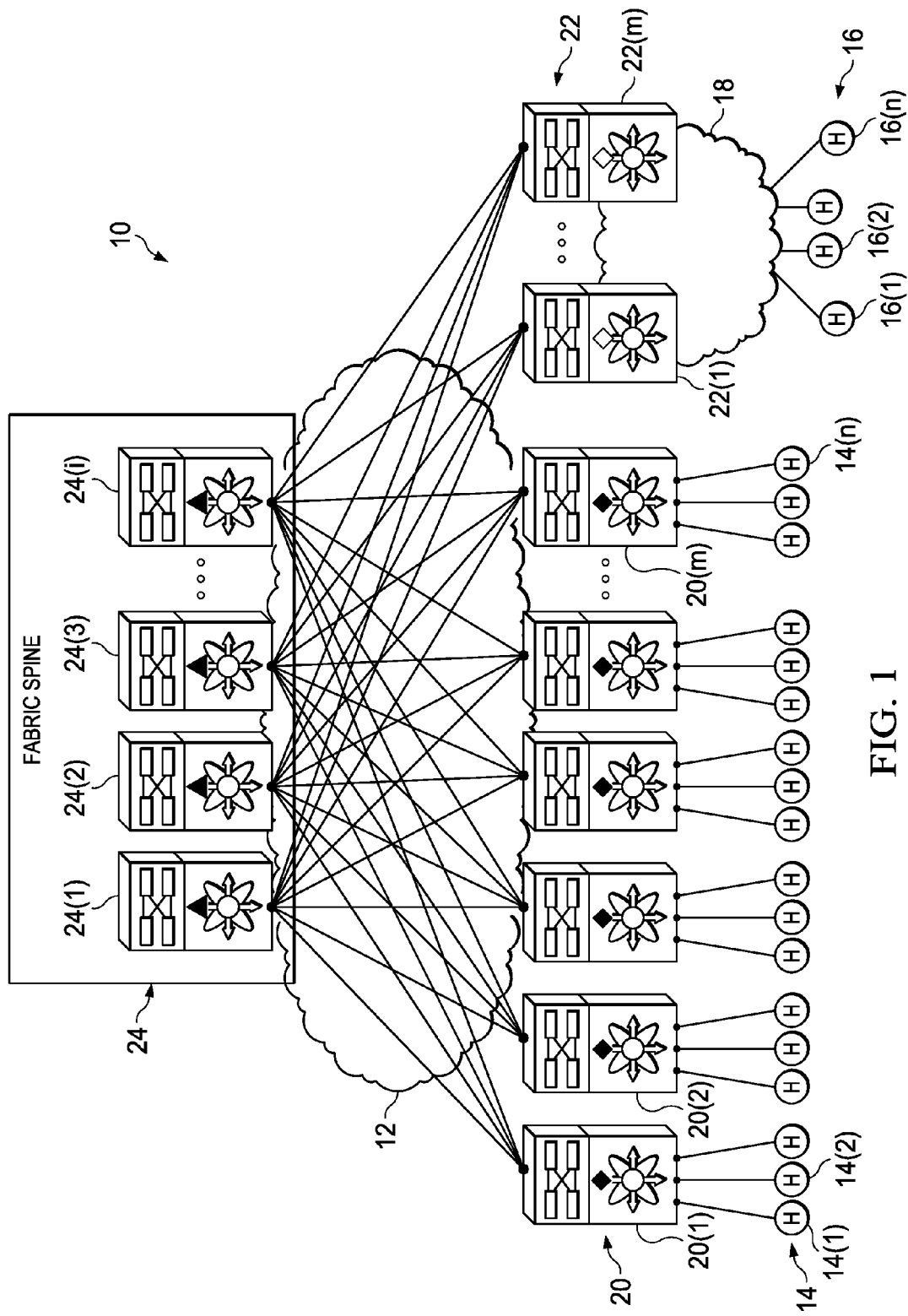
FIG. 1 is a simplified schematic block diagram illustrating a communication system for enabling conversational learning in a network environment.

FIG. 1 is a simplified schematic block diagram illustrating a communication system 10 for enabling conversational learning in a network environment. In FIG. 1, communication system 10 includes a network 12 (generally shown as various links) that interconnect hosts 14(1), 14(2), . . ., and 14(n) (generally referred to as hosts 14) and external hosts 16(1), 16(2), . . . , and 16(N) (generally referred to as external hosts 16), where n represents a total number of hosts 14 and N represents a total number of external hosts 16. External hosts 16 connect to network 12 over an external network 18. In various embodiments, network 12 represents a network fabric that provides a multistage, switching network in which every connected host (e.g., hosts 14) is reachable through a same number of hops. In various embodiments, network 12 can include overlay architecture, such as that provided in Transparent Interconnect of Lots of Links (TRILL) networks and Cisco® FabricPath. In various embodiments, communication system 10 can deploy Cisco® Dynamic Fabric Automation (DFA) for configuring network 12, which can optimize a networking environment through superior integration. In some embodiments, network 12 is a data center network that deploys Cisco® DFA, providing a next generation data center architecture that offers scalability and multi-tenancy, along with orchestration simplicity.

Hosts 14 can communicate (for example, by receiving/forwarding packets) with each other over network 12, and hosts 14 can communicate (for example, by receiving/forwarding packets) with external hosts 16 connected to network 12 over external network 18. As used herein, the term "host" may include any network element, physical or virtual, connected to other network elements over a network. Hosts may provide data and other services to network elements. In a client-server model, hosts may include servers. In a peer-to-peer network, each computer may be a host. Hosts may also include computers participating in networks that use Internet Protocol (IP). In a general sense, each host has a specific, unique address (e.g., IP address) associated therewith. Hosts can include physical machines (for example, servers) and virtual machines (VMs). Further, the term "external host" may include any host connected to a network (e.g., network 12) over an external network (e.g., external network 18).

Network 12 includes various network nodes configured to perform spine/leaf roles, enabling a scale-out network model for optimizing growth of communication system 10—leaf switches 20(1), 20(2), . . ., and 20(m) (generally referred to as leaf switches 20) that connect hosts 14 to network 12, where m is a total number of leaf switches 20; border leaf switches 22(1), 22(2), . . ., and 22(M) (generally referred to as border leaf switches 22) that connect external hosts 16 to network 12, where M is a total number of border leaf switches 22; and spine switches 24(1), 24(2), . . ., and 24(j) (collectively referred to as a fabric spine 24 of network 12) that connect leaf switches 20 and/or border leaf switches 22 to one other, where j is a total number of spine switches of the fabric spine 24. Leaf switches 20, border leaf switches 22, and spine switches can connect to network 12 via network interfaces (depicted as shaded circles), such as ports through which leaf switches 20, border leaf switches 22, and/or spine switches connect to one another. Leaf switches 20 can include host interfaces (depicted as unshaded circles), for example, ports through which hosts 14 connect to leaf switches 20, such that leaf switches 20 can forward packets between hosts 14 over network 12. In various embodiments, each leaf switch 20 can serve as a Top-Of-Rack (ToR) switch of a respective rack unit in a data center network environment, where network 12 serves as a data center network. Border leaf switches 22 can connect to external network 18 via another network interface (not depicted), such that border leaf switches 22 can forward packets between hosts 14 and external hosts 16 over network 12. Fabric spine 24 can forward packets between leaf switches 20 and/or border leaf switches 22, enabling a single tier network fabric in various embodiments. In some network topologies, fabric spine 24 can include one level of switches (such as a 2-tier fat tree topology); and in other network topologies, fabric spine 24 can include multiple levels of switches (such as a 3-tier fat tree topology). Virtually any number of switches may be used in network 12 depending on network topology considerations for communication system 10.

As used herein, the term "switch" includes any network element configured to receive packets from a source (e.g., host 14(1)) and forward packets appropriately to a destination in a network (e.g., host 14(n)) or a destination out of network (e.g., external host 16(1)). The term "leaf switch" is inclusive of routers, switches, and such other network elements with packet routing, bridging, and switching functionalities that are connected to one or more hosts (e.g., hosts 14). The term "border leaf switch" is inclusive of routers, switches, and such other network elements with packet routing, bridging, and switching functionalities that are connected to external entities, such as one or more external hosts (e.g., external hosts 16). The term "fabric spine" and/or "spine switch" is inclusive of routers, switches, and such other network elements with packet routing, bridging, and switching functionalities that connect one or more leaf switches (e.g., leaf switches 20) and/or one or more border leaf switches (e.g., border leaf switches 22). Further, the term "leaf"/"border leaf" and "spine" are used merely to distinguish between two layers of switches in the network architecture depicted in FIG. 1, and are not meant to be limitations. In a general sense, a "leaf"/"border leaf" switch differs from a "spine" switch by being configured to anchor hosts 14/external hosts 16 to network 12, and a "border leaf" switch differs from a "leaf" switch by being configured to anchor external entities (e.g., external hosts 16) to network 12. In various embodiments, spine switches may be referred to as aggregation switches, and leaf switches 20 and border leaf switches 22 may be referred to as access (or edge) switches in an access/aggregation network topology. Furthermore, as used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof This may be inclusive of appropriate algorithms and communication protocols that allow for the effective exchange of data or information.

Figure 2:
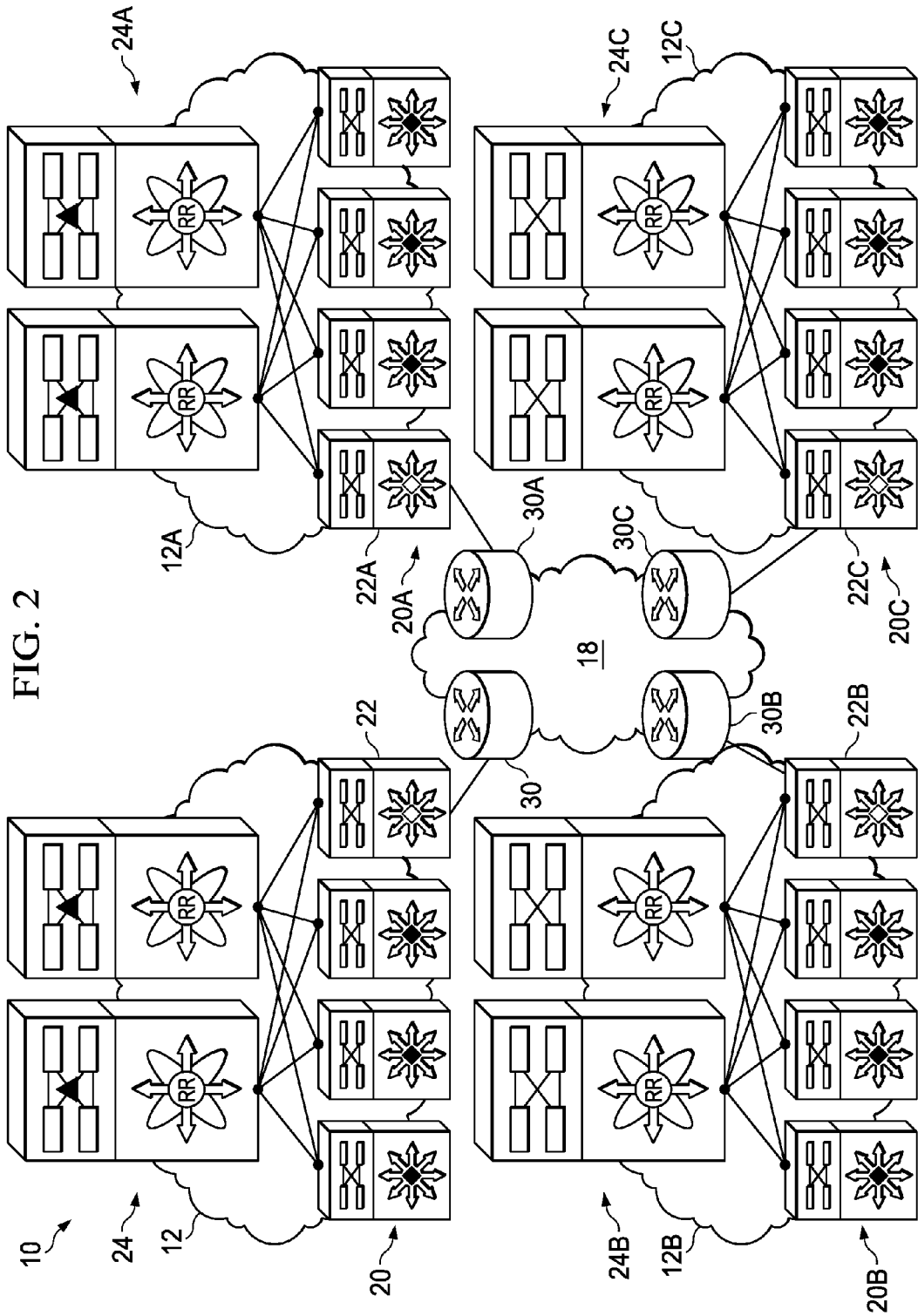
FIG. 2 is a simplified block diagram illustrating example details associated with the communication system.

As noted, border leaf switches 22 can provide connectivity external to network 12, for example, to external network 18. External network 18 can be the Internet, a wide area network (WAN), a data center interconnect (DCI), other appropriate network, or any combination thereof In various embodiments, network 12 can flexibly interconnect with other networks over external network 18 via border leaf switches 22. FIG. 2 is a simplified schematic block diagram of an exemplary configuration of communication system 10 that flexibly interconnects network 12 to various other networks, such as a network 12A, a network 12B, and a network 12C, over external network 18. In FIG. 2, networks 12A, 12B, and 12C each include respective leaf switches 20A, 20B, and 20C; respective border leaf switches 22A, 22B, and 22C; and respective fabric spines 24A, 24B, and 24C (which include spine switches). In various embodiments, border leaf switch 22 can connect to external network 18 via an interface, such as a router 30; border leaf switch 22A can connect to external network 18 via a router 30A; border leaf switch 22B can connect to external network 18 via a router 30B; and border leaf switch 22C can connect to external network 18 via a router 30C. Networks 12, 12A, 12B, and 12C are thus interconnected via respective border leaf switches 22, 22A, 22B, and 22C. In various embodiments, each border leaf switch 22, 22A, 22B, and/or 22C can connect to external network 18 via a firewall and/or data center interconnect device. In various embodiments, each border leaf switch 22, 22A, 22B, and/or 22C itself may serve as a single box solution that interfaces with external network 18.

Communication system 10 can include a network topology configured to include any number of servers, virtual machines, switches, routers, and other network nodes interconnected to form network 12. Network elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Furthermore, the exemplary network environment may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A typical data center architecture has hosts (e.g., host 14) deployed in racks, each of the racks being interfaced by ToR switches (e.g., leaf switches 20). In a leaf/spine network topology, the ToR switches are interconnected via spine switches (e.g., fabric spine 24), thereby allowing any-to-any communication between hosts 14. For example, the data center network architecture (e.g., network 12) may include a 2-tier spine-leaf topology (extensible to multiple tiers) where there may be a separation between a host address space (also referred to as an end-station address space) and topology space, allowing the two to be independently scaled.

To optimize communications in network 12, communication system 10 can move Layer 3 switching to ToR switches (e.g., leaf switches 20) and switches providing external connectivity to network 12 (e.g., border leaf switches 22). Leaf switches 20 and border leaf switches 22 can thus implement segment ID-based forwarding, thereby enhancing control-plane and forwarding-plane functionality. As used herein, the terms "Layer 3 switch" and "Layer 3 router" may be used interchangeably to refer to a network element that forwards packets using Layer 3 parameters (e.g., IP address).

Layer 3 switches can perform IP switching (rather than MAC switching) at a hardware level. A Layer 3 switch can build an IP routing table (such as a routing information base (RIB) table) that maintains (stores) an entire network's topology (e.g., entire topology of network 12), and a Forwarding Information Base (FIB) table that maintains a platform specific image of forwarding information contained in the IP routing table. The IP forwarding table includes all IP routing information, including but not limited to, all routes learned via dynamic routing protocols, all directly attached networks, and any additional configured routes, such as static routes. Layer 3 switches can run routing protocols, such as border gateway protocol (BGP), multiprotocol extensions for BGP (MP-BGP), internal BGP (iBGP), equal-cost multi-path routing (ECMP), open shortest path first (OSPF), or routing information protocol (RIP), to communicate with other Layer 3 switches or routers and build their respective IP routing tables. The FIB table maintains next hop address information based on the information in the IP routing table. In various embodiments, the IP routing table includes a list of all destinations and various next hops that can be used to reach those destinations, and the FIB table maintains the destinations along with the best next-hops to reach those destinations. Typically, the FIB table can be held in hardware (e.g., a suitable memory element) for referencing to maintain high throughput. When routing or topology changes occur in the network, the IP routing table is updated, and those changes can be reflected in the FIB table.

In addition to the FIB table, Layer 3 switches can use adjacency tables to pre-append Layer 2 addressing information, which can be referred to as FIB/ADJ tables. An adjacency table can maintain Layer 2 next-hop addresses (e.g., adjacent node addresses) for the FIB table entries. Network nodes are said to be adjacent if they can reach each other with a single hop across a link layer. Each adjacency entry stores pre-computed frame headers that are used for forwarding a packet using a FIB entry referencing the corresponding adjacency entry. The adjacency table is populated as adjacencies are discovered. Each time an adjacency entry is created, such as from an Address Resolution Protocol (ARP) protocol (e.g., protocol used for resolution of network layer addresses into link layer addresses), a link-layer header for that adjacent node is pre-computed and stored in the adjacency table.

To further optimize communications and enhance scalability of network 12, communication system 10 can enable conversational learning on Layer 3 switches. Generally, when a Layer 3 switch is configured for conversational learning, the Layer 3 switch can learn routing information associated with any network element, while installing in hardware only routing information associated with network elements engaged in active conversations. For example, software on the Layer 3 switch can learn and initially store (for example, in a software cache) received routing information and decide based on active conversations to store the routing information in hardware (for example, as an entry in the FIB table). In various embodiments, the Layer 3 switch can implement conversational learning to install in hardware only IP addresses that the Layer 3 switch is having a bidirectional active conversation, and further age out IP addresses associated with network elements that are no longer associated with active conversations. L3 conversational learning can thus significantly conserve FIB table space, particularly beneficial for scalability in network environments.

Figure 3:
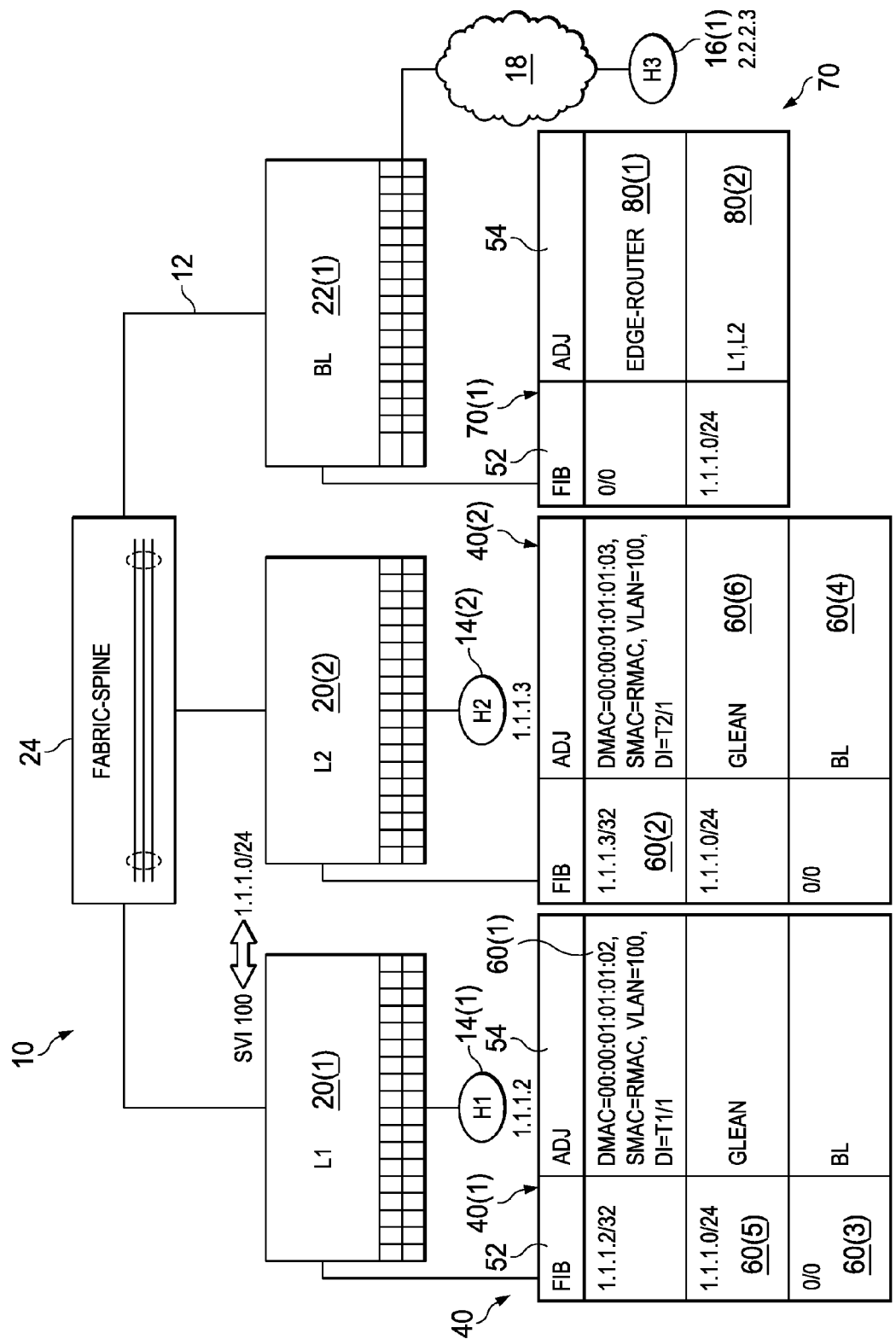
FIG. 3 is a simplified block diagram illustrating an exemplary configuration of the communication system that can enable conversational learning.

Turning to FIG. 3, FIG. 3 is a simplified block diagram illustrating an exemplary configuration of communication system 10 that enables conversational learning in network 12. In the depicted configuration, host 14(1) (corresponding to H1) is connected to leaf switch 20(1), host 14(2) (corresponding to H2) is connected to leaf switch 20(2), and external host 16(1) (corresponding to H3) is connected to border leaf switch 22(1) over external network 18. The exemplary configuration includes two leaf switches 20(1) and 20(2) and a single border leaf switch 22(1) merely for ease of illustration. Any number of leaf switches and/or border leaf switches may be included in communication system 10.

Each leaf switch has an associated FIB/ADJ table (generally referred to as FIB/ADJ tables 40)—leaf switch 20(1) has an associated FIB/ADJ table 40(1), and leaf switch 20(2) has an associated FIB/ADJ table 40(2). FIB/ADJ tables 40 can include two fields: a FIB field 52 and an ADJ field 54. The fields are merely representations, to illustrate example information included therein. As used herein, the term "FIB/ADJ table" can include FIB table, adjacency table, or a combination thereof In a general sense, FIB/ADJ tables 40 include any number of fields, populated with corresponding information related to network 12, according to particular hardware, network, and/or configuration considerations, which may be stored in any appropriate format. For example, each FIB/ADJ table 40 may include/128 addresses,/32 addresses,/24addresses, and other prefixes. In some embodiments, FIB/ADJ tables 40 may contain an association between a source IP address (SIP) and a corresponding port (if local SIP) or corresponding source node (if remote SIP) and/or an association between destination IP address (DIP) and corresponding port (if local DIP) or corresponding destination node (if remote DIP). In addition, FIB/ADJ tables 40 can include status information, SIP/DIP hit bit, and other suitable information based on particular configuration needs of network 12. As used herein, the term "adjacency information" includes source MAC address (SMAC), destination MAC address (DMAC), device interface, virtual local area network (VLAN), and such other information computed from packet headers of packets forwarded within network 12. In some embodiments, FIB/ADJ tables 40 may include two separate tables (e.g., a FIB table and an adjacency table). In some embodiments, FIB/ADJ tables 40 may be implemented with fast hardware lookup mechanisms, such as ternary content addressable memory (TCAM). In various embodiments, each FIB/ADJ table 40 may be implemented in hardware (e.g., in a static random access memory (SRAM) or content addressable memory (CAM)) of its associated leaf switch 20.

By moving Layer 3 routing to the leaf switches 20, communication system 10 offers a distributed gateway where a same switch virtual interface (SVI) can coexist at any and all leaf switches, facilitating optimal forwarding between hosts 14 and enabling failure domain localization to leaf switches 20. For example, turning to FIG. 3, in various embodiments, leaf switch 20(1) (e.g., L1) and leaf switch 20(2) (e.g., L2) can be assigned to a subnet 1.1.1.0/24 in a VLAN 100 with a corresponding SVI. As used herein, the term "subnet" is a logical grouping of connected network elements. Typically, network elements in a same subnet may share contiguous ranges of IP address numbers. In general, a subnet is a Layer 3 construct, compared to a VLAN, which is a Layer 2 construct. In a network environment employing VLANs, a one-to-one relationship can exist between VLANs and subnets, although it is possible to have multiple VLANs on one subnet (e.g., using private VLANs). VLANs and subnets can provide independent Layer 2 and Layer 3 constructs that map to one another.

MP-BGP can be implemented to distribute host routes (e.g., IP addresses, such as/32 addresses or/128 addresses) associated with hosts 14 among the leaf switches 20 (here, leaf switch 20(1) and leaf switch 20(2)) scoped by host virtual routing and forwarding (vrf). In various embodiments, leaf switches 20 implement Layer 3 conversational learning schemes for configuring associated FIB/ADJ tables 40. In other words, FIB/ADJ tables 40 store information of hosts 14 participating in active communication (e.g., actively receiving/forwarding packets) in network 12. In such a model, hosts 14 advertise (communicate) associated host routes via a standard protocol (e.g., internal Border Gateway Protocol (iBGP) or central database/controller based scheme). Upon receiving host routes associated with hosts 14 in network 12, leaf switch 20(1) and leaf switch 20(2) include software that can initially store the host routes. For example, remote host routes are initially stored in software caches associated with leaf switch 20(1) and leaf switch 20(2), and thus not automatically installed in hardware (e.g., FIB/ADJ tables 40) by default. When a particular host 14 is involved in active conversation, leaf switch 20(1) and/or leaf switch 20(2) can store the host route information in hardware, for example, by writing the host route information in respective FIB/ADJ table 40(1) and FIB/ADJ table 40(2). Such auto-configuration ensures that appropriate resources in terms of vrf, VLAN, SVI, etc. are allocated on the leaf switches 20 based on hosts 14 engaging in active conversations.

In the depicted embodiment, FIB/ADJ table 40(1) can include an entry 60(1), corresponding to directly connected host 14(1). Entry 60(1) may indicate an IP address (such as a/32 address) of host 14(1), for example, as 1.1.1.2/32, corresponding to destination MAC address of 00:00:01:01: 01:02; source MAC address that is the same as a router MAC (RMAC) address; a VLAN, such as VLAN 100; and a device interface, such as device interface D1 being T1/1. Likewise, FIB/ADJ tables 40(2) can include an entry 60(2) corresponding to directly connected host 14(2). Entry 60(2) may indicate an IP address (such as a/32 address) of host 14(2), for example, as 1.1.1.3/32, corresponding to destination MAC address of 00:00:01:01:01:03; source MAC address that is the same as RMAC address; a VLAN, such as VLAN 100; and a device interface, such as device interface D1 being T2/1.

Typically, border leaf switch 22(1) advertises a default route, thereby attracting host traffic that needs forwarding externally, for example, to the Internet or a data center interconnect network. In various embodiments, border leaf switch 22(1) advertises a default route for each vrf instance (here, including FIB/ADJ table 40(1) and FIB/ADJ table 40(2)) within network 12. This ensures that, on a forward path (e.g., when packets are forwarded from hosts 14 to external hosts 16), traffic is optimally forwarded (e.g., via a one-hop path) to border leaf switch 22(1) via which it is sent toward external network 18. Accordingly, FIB/ADJ table 40(1) can include an entry 60(3) corresponding to border leaf 22(1), and FIB/ADJ table 40(2) can include an entry 60(4) corresponding to border leaf 22(1). Entry 60(3) and entry 60(4) may indicate a default route respectively for leaf switch 20(1) and leaf switch 20(2), for example, as 0/0, corresponding to border leaf 22(1), to facilitate forwarding of packets to external network 18 (for example, to external host 16(1)).

By employing IP-based forwarding, efficient usage of FIB/ADJ table space becomes critical, especially in high-scale multi-host environments. In various embodiments, Layer 3 conversational learning based schemes can install glean-based subnet routes in hardware (for example, associated FIB/ADJ table) that in turn allow on-demand installation of remote host routes based on active conversations. Typically, glean/punt entries are installed due to instantiation of a Layer 3 interface (e.g., SVI) on a leaf switch 20. In various embodiments, upon instantiation of the SVI corresponding with VLAN 100 assigned to a subnet 1.1.1.0/24, leaf switches 20 can install a subnet prefix route in hardware with a corresponding glean adjacency. For example, FIB/ADJ table 40(1) can include an entry 60(5) that indicates a subnet address, for example, 1.1.1.0/24 corresponding to a glean/punt adjacency; and FIB/ADJ table 40(2) can include an entry 60(6) that indicates a subnet address, for example, 1.1.1.0/24 corresponding to a glean/punt adjacency. In operation, when leaf switch 20(1) receives a packet that needs forwarding to a specific host (for example, host 14(2)), leaf switch 20(1) determines whether FIB/ADJ table 40(1) includes a specific prefix associated with host 14(2) (such as the IP address of host 14(2)). If the specific prefix does not exist (here, FIB/ADJ table 40(1) does not include the IP address for host 14(2)), then leaf switch 20(1) evaluates a subnet prefix associated with the host 14(2), for example, 1.1.1.0/24, indicating that leaf switch 20(1) will need to glean more information to forward the packet. In various embodiments, leaf switch 20(1) triggers software, such as an IP routing table (e.g., RIB table) to install an entry for the specific host (e.g., host 14(2)) in hardware (e.g., FIB/ADJ table 40(1). For example, an entry (not shown) can be installed in FIB/ADJ table 40(1) that indicates an IP address of host 14(1), for example, as 1.1.1.2/32, corresponding to the network element anchoring host 14(2) to network 12 (e.g., a corresponding L2 adjacency). In various embodiments, the glean adjacency indicates that any addresses within the subnet prefix can be forwarded for address resolution protocol (ARP) processing. A specific prefix, such as IP address 1.1.1.3/32, associated with host 14(2) can be determined and then subsequently stored in FIB/ADJ table 40(1) (not shown). Alternately, in various embodiments, aggregate (or per-subnet) prefixes can be configured on the leaf switches 20 to install glean entries without burning SVI resources. Leaf switch 20(2) operates similarly for populating its FIB/ADJ table 40(2).

Each border leaf switch also has an associated FIB/ADJ table (generally referred to as FIB/ADJ tables 70)—for example, border leaf switch 22(1) has an associated FIB/ADJ table 70(1), which also includes the two fields, FIB field 52 and ADJ field 54. In various embodiments, an interface to external network 18 can advertise a default route, for example, to border leaf switch 22(1), thereby attracting host traffic that needs forwarding to external hosts 16 over external network 18. Upon receiving the interface route advertisement, border leaf switch 22(1) can install routing information associated with the external network interface in FIB/ADJ table 70(1). For example, FIB/ADJ table 70(1) can include an entry 80(1) corresponding to an edge router (e.g., edge router 30) of external network 18. Entry 80(1) may indicate a default route, for example, as 0/0, corresponding to the edge router, to facilitate forwarding of packets to external hosts 16 over external network 18 (for example, to external host 16(1)).

Border leaf switches 22 can also install a subnet prefix route in hardware, similar to leaf switches 20. Typically, upon receiving a subnet prefix route advertisement, border leaf switches 22 can install information associated with the subnet prefix route advertisement in hardware (e.g., associated FIB/ADJ tables 70). Such information can include an adjacency entry (for example, an equal-cost multi-path routing (ECMP) entry) that indicates a number of leaf switches 20 that advertise reachability at the subnet prefix. For example, in various embodiments, FIB/ADJ table 70(1) can include an entry 80(2) that indicates a subnet address, for example, 1.1.1.0/24 corresponding to all leaf switches 20 assigned to the subnet address (here, leaf switch 20(1) (e.g., L1) and leaf switch 20(2) (e.g., L2)). If a subnet spans multiple leaf switches 20, then FIB/ADJ table 70(1) can be consumed by a significant number of adjacency/next-hop entries.

Such configuration for border leaf switches 22 can result in sub-optimal traffic routing/forwarding (e.g., via a two-hop path) in reverse paths, where packets are forwarded from external network 18 (for example, from external hosts 16) to network 12 (for example, to hosts 14). In various embodiments, when a packet destined for host 14(1) reaches border leaf switch 22(1) from external network 18 (for example, from external host 16(1)), the packet may be sub-optimally forwarded in the following manner: when border leaf switch 22(1) receives the packet for forwarding to host 14(1), border leaf switch 22(1) may evaluates a subnet prefix associated with the host 14(1), for example, 1.1.1.0/24, which indicates that border leaf switch 22(1) can forward the packet to either leaf switch 20(1) (e.g., L1) or leaf switch 20(2) (e.g., L2) according to the ECMP entry in FIB/ADJ table 70(1). Since border leaf switch 22(1) can forward the packet to any leaf switch that has reachability to destination subnet 1.1.1.0/24, for example, in various embodiments, border leaf switch 22(1) may forward the packet to leaf switch 20(2) (e.g., L2) instead of leaf switch 20(1) (e.g., L1), then requiring leaf switch 20(2) (e.g., L2) to forward the packet on to leaf switch 20(1) (e.g., L1), which is forwarded to host 14(1). The packet thus reaches destination host 14(1) via a two-hop path.

To achieve optimal routing when communication system 10 is configured as depicted in FIG. 3, border leaf switches 22 can install all host routes in their respective FIB/ADJ tables 70. However, FIB/ADJ table space can become severely constrained if all host routes are blindly installed in hardware. In situations where communication system 10 is configured to interconnect various networks as depicted in FIG. 2, border leaf switches 22 will also need to install all host routes associated with the other networks. As scalability within network 12 increases, communication burdens will thus only increase on border leaf switches 22. For example, in various embodiments, where a Cisco Nexus 7000 F3-Series module is implemented as a border leaf switch, a total FIB table size is about 64,000 entries, which is insufficient for massively scalable data center frameworks, which can require about 300,000 up to 1 million host routes (including Internet Protocol version 4 (IPv4) and Internet Protocol version 6 (IPv6)). While a scale-out model is possible, where host vrf instances can be distributed among multiple border leaf switches 22, FIB table limitations remain due to a high number of host routes, still requiring a large number of border leaf switches 22 for distribution, increasing network management and configuration complexity. Further, configuring aggregate or per-subnet prefixes on border leaf switches 22 each time a new subnet is instantiated may not provide a feasible or practical option, since such solution needs an intelligent orchestration entity that can intelligently push appropriate configurations to appropriate border leaf switches, as the number of hosts and subnets continue to increase. Furthermore, redundancy requirements and two box solutions for providing external connectivity to network 12 (for example, border leaf switch plus an edge router (e.g., border leaf switch 22 plus edge router 30)) already significantly increase a necessary number of network nodes.

Accordingly, a need exists for improved solutions for border leaf switch scalability in network environments, particularly in massively scalable data center (MSDC) environments. A solution is desired that provides optimal routing/forwarding (e.g., via a one-hop path), yet requires minimal to no manual configuration, particularly since current network configuration deployments (such as Cisco® DFA) advance network fabric automation, superior management, and enhanced forwarding at a high scale. The following discussion proposes an exemplary configuration for communication system 10 that addresses these issues (and others) in offering a system and method that can implement conversational learning in a network environment, for example, by enabling conversational learning on border switches 22. Embodiments of communication system 10 described below can improve IP-scalability in distributed platforms, for example, MSDCs, by implementing various enhancements to conversational learning schemes and/or configurations, with a particular focus on inter-network (for example, inter-data center) or external communications. In various embodiments, communication system 10 is configured to provide an automated, touchless mechanism that enables conversational learning (such as Layer 3 conversational learning) on border leaf switches 22 in network environments, including data center environments, such that only host routes that are involved in active conversation with inter-data center entities (e.g., external hosts 16) are installed in forwarding/routing tables (for example, in Layer 3 tables, such as FIB/ADJ tables 70). With Layer 3 conversational learning according to embodiments of communication system 10 described below, the present disclosure addresses routing table (e.g., FIB table) scalability issues, particularly predominant on border leaf switches 22.

Figure 4:
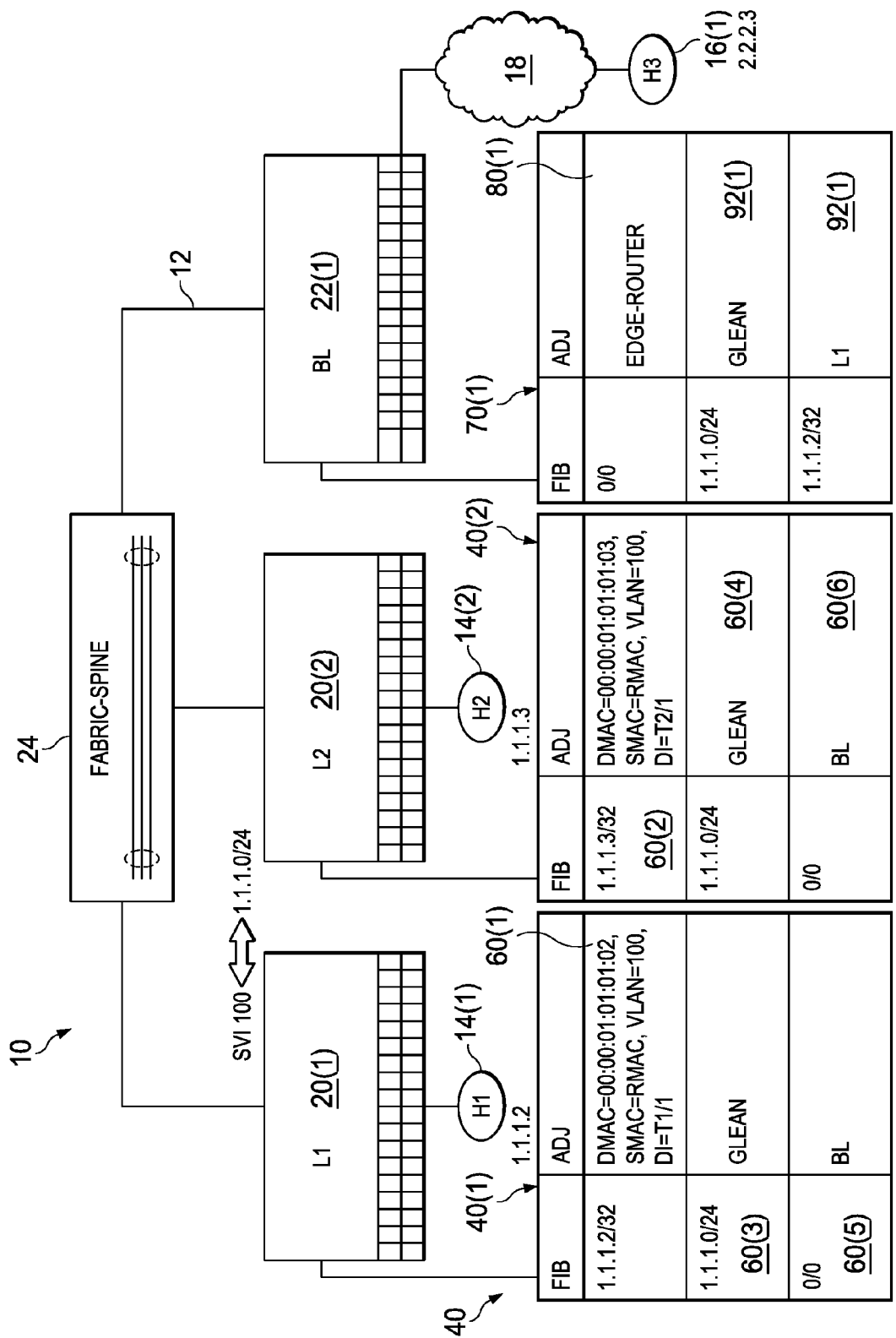
FIG. 4 is a simplified block diagram illustrating another exemplary configuration of the communication system that can enable conversational learning.

Turning to FIG. 4, FIG. 4 is a simplified block diagram illustrating an exemplary configuration of communication system 10 that enables conversational learning in network 12. For example, communication system 10 is configured to enable conversational learning on border leaf switches 22. In various embodiments, communication system 10 is configured such that, upon receiving a subnet prefix route advertisement, border leaf switches 22 can install a subnet prefix route in hardware (e.g., associated FIB/ADJ tables 70) with a corresponding glean adjacency. In such a model, routing information can be advertised to leaf switches (leaf switches 20 and border leaf switches 22) via a standard protocol, such as internal Border Gateway Protocol (iBGP) or central database/controller based scheme.

In FIG. 4, upon establishing a direct connection to a subnet, leaf switches 20 can install a direct subnet route associated with the direct connection in its associated routing table, and then, redistribute directly connected subnet into a routing protocol that includes a special reserved tag (value). Upon receiving the redistributed subnet route (prefix) with the special reserved tag (value), network elements of network 12 (e.g., leaf switches 20 and border leaf switches 22) know that the subnet route is being advertised as the result of a direct subnet route as opposed to other routes within the routing protocol, such as static routes, host routes, or other routes. The network elements can use the special reserved tag (value) to apply specific routing policies. For example, the special reserved tag (value) indicates that a network element can implement glean/punt adjacency behavior associated with the subnet route.

In various implementations, leaf switches 20 can attach an attribute to the redistributed subnet route (prefix). For example, leaf switches 20 can attach a community attribute or extended community attribute to the subnet prefix via an appropriate route map. In general, the term "community attribute" refers to a transitive or non-transitive, optional attribute that can trigger routing decisions according to a specific community. A community can represent a group of destinations (e.g., leaf switches 20/border leaf switches 22) that share some common property. The community attribute can have a variable length. In some embodiments, a community attribute includes four octets, while an extended community attribute includes eight octets. In various embodiments, leaf switches 20 redistribute the direct subnet route into iBGP with a community attribute via an appropriate route map. In various embodiments, community attribute may be a cost extended community attribute, generally referring to a transitive or non-transitive extended community attribute that is passed to iBGP and confederation peers but not to external BGP (eBGP) peers. The cost community feature allows you to customize local route preferences and influence best-path selection processes by assigning cost values to specific routes. By using a simple route tag based approach as described with reference to FIG. 4, direct subnet routes corresponding to local SVIs, can thus be advertised into iBGP so that such advertisements reach all leaf switches, including border leaf switches.

In FIG. 4, upon instantiating an SVI, for example, SVI corresponding with VLAN 100, leaf switch 20(1) can establish a direct connection to subnet 1.1.1.0/24 and install a direct subnet route associated with the direct connection in its associated routing tables. Leaf switch 20(1) can redistribute directly connected subnet into a routing protocol (for example, iBGP) and attaches a special reserved tag (value) (for example, an extended community attribute). In various embodiments, leaf switch 20(1) redistributes subnet route, for example, for being subnet network 1.1.1.0/24, into iBGP with a community attribute as follows:

interface Vlan100
      no shutdown
      vrf member blue
      ip address 192.1.1.1/24 tag 12345
      fabric forwarding mode proxy-gateway
    show route-map FABRIC-RMAP-REDIST-SUBNET
    route-map FABRIC-RMAP-REDIST-SUBNET, permit,
      sequence 10
      Match clauses:
        tag: 12345
      Set clauses:
        extcommunity 4BYTEAS-GENERIC:NT:999999:
        99

In this example, VLAN interface 100 is configured with an IP address, for example, being 192.1.1./24, with a proxy-gateway forwarding mode, associated with a vrf instance identified by vrf member blue. A show route-map command displays all route maps configured or only a route map specified (e.g., FABRIC-RMAP-REDIST-SUBNET), where the route map can define which routes from a specified routing protocol can be redistributed into the target routing process. Here, where the show route-map command outputs route-map, FABRIC-RMAP-REDIST-SUBNET, which includes: a route-map field defines a name of the route map (e.g., FABRIC-RMAP-REDIST-SUBNET), permit field indicates that the subnet route is redistributed as controlled by set actions (e.g., match clauses and set clauses); a sequence field specifies a number (e.g., 10) that indicates a position a new route map is to have in the list of route maps already configured with a same name; a match clauses tag field defines match criteria, conditions under which redistribution is allowed for the current route map (e.g., tag: 12345); and a set clauses metric field defines set actions, particular redistribution actions to perform if the criteria enforced by the match commands are met (e.g., extended community attribute, such as extcommunity 4BYTEAS -GENERIC:NT: 999999:99).

Upon receiving the redistributed subnet route, border leaf switch 22(2) can make routing decisions based on the community attribute. In the present example, when border leaf switch 22 receives the redistricted subnet route with attached extended community attribute (e.g., 4BYTEAS-GENERIC:NT:999999:99), border leaf switch 22(1) recognizes that the subnet route being advertised is a result of a direct subnet route (e.g., between leaf switch 20(1) and subnet 1.1.1.0/24 assigned to VLAN 100), as opposed to other subnet routes. Border leaf switch 22(1) can then install information associated with the redistributed subnet route in software (e.g., associated RIB table) and hardware (e.g., associated FIB/ADJ table 70(1)) with a corresponding glean adjacency, thereby providing a trigger from hardware to software of border leaf switch 22(1) to install host entries on demand. In this way, only hosts involved in active communication with entities outside network 12 (e.g., external host 16(1)) will be installed in hardware of border leaf switch 22(1) (e.g., associated FIB/ADJ table 70(1)). In various embodiments, FIB/ADJ table 70(1) can include an entry 92(1) that indicates a subnet address, for example, 1.1.1.0/24 corresponding to a glean/punt adjacency, indicating border leaf switch 22(1) will need to glean more information to forward a packet destined for hosts having matching subnet prefixes. Accordingly, in operation, when border leaf switch 22(1) receives a packet from an external entity (e.g., external host 16(1)) that needs forwarding to a specific host (for example, host 14(1)), border leaf switch 22(1) determines whether FIB/ADJ table 70(1) includes a specific prefix associated with host 14(1) (such as the IP address of host 14(1)). If the specific prefix does not exist (here, FIB/ADJ table 70(1) initially does not include the IP address for host 14(1)), then border leaf switch 22(1) triggers software, such as an IP routing table (e.g., RIB table) to install an entry for the specific host in hardware (e.g., FIB/ADJ table 70(1). For example, in various embodiments, an entry 92(2) can be installed in FIB/ADJ table 70(1) that indicates an IP address of host 14(1), for example, as 1.1.1.2/32, corresponding to the network element anchoring host 14(1) to network 12 (e.g., a corresponding L1 adjacency). In various embodiments, the glean adjacency indicates that any addresses within the subnet prefix can be forwarded for address resolution protocol (ARP) processing. A specific prefix, such as IP address, associated with the host can be determined and then subsequently stored in FIB/ADJ table 70(1) (not shown).

Such configuration for border leaf switches 22 can result in optimal traffic routing/forwarding (e.g., via a one-hop path) in reverse paths, where packets are forwarded from external network 18 (for example, from external hosts 16) to network 12 (for example, to hosts 14). In various embodiments, when a packet destined for host 14(1) reaches border leaf switch 22(1) from external network 18 (for example, from external host 16(1)), the packet may be optimally forwarded in the following manner: when border leaf switch 22(1) receives the packet for forwarding to host 14(1), border leaf switch 22(1) may evaluate a subnet prefix associated with the host 14(1), for example, 1.1.1.0/24, which indicates that border leaf switch 22(1) needs to glean more information. As noted above, the glean adjacent will triggers software, such as an IP routing table (e.g., RIB table) to install entry 92(2) in FIB/ADJ table 70(1) that indicates the IP address of host 14(1), for example, as 1.1.1.2/32, with a corresponding L1 adjacency. Border leaf switch 22(1) then forwards the packet to leaf switch 20(1) (e.g., L1) per the FIB/ADJ table 70(1). The packet can thus reach destination host 14(1) via a one-hop path.

Note that, in this way, whenever host routes within communication system 10 are active, a corresponding subnet route will be automatically advertised (for example, via iBGP) to border leaf switches 22, which in turn can install information associated with the subnet route in hardware (e.g., FIB/ADJ tables 70) against a glean adjacency, without instantiating all SVIs (which may not be not a feasible option, even if it were possible) Such configuration facilitates a touchless/automated efficient handling on border leaf switches with respect to utilizing forwarding/routing resources (for example, forwarding/routing table resources, such as L3 table resources (e.g., FIB tables). Embodiments of communication system 10 as configured in FIG. 4 can minimize a number of exit points from network 12 needed for external connectivity (in various embodiments, minimizing a number of border leaf switches 22); use existing routing protocol (e.g., iBGP) subnet advertisements with a special extended community or potentially a cost community; automatic configuration of switches, such as border leaf switches 22, as subnets are created, deleted, and/or modified, essentially eliminating any manual configuration; and greatly improve routing table utilization, for example, FIB table utilization on border leaf switches 22. Different embodiments may have different advantages than described herein, and no particular advantage is necessarily required of any of the embodiments described herein.

Figure 5:
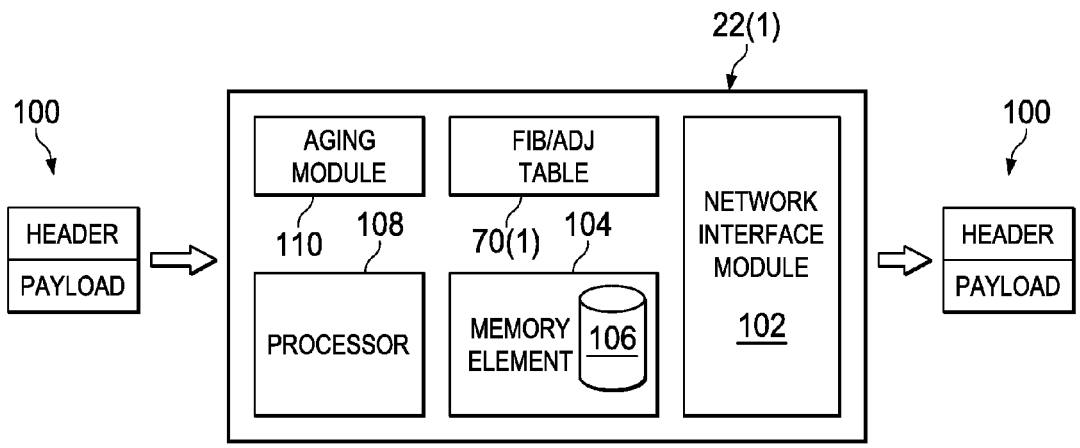
FIG. 5 is a simplified block diagram illustrating example details of the communication system for enabling conversational learning.

Turning to FIG. 5, FIG. 5 is a simplified block diagram illustrating example operations that may be associated with embodiments of communication system 10. In FIG. 5, a representative border leaf switch 22(1) configured to receive/forward a packet(s) 100 from/to external network 18 and receive forward packet(s) 100 from/to network 12. In various embodiments, border leaf switch 22(2) provides optimal traffic forwarding by implementing conversational learning as described herein. Border leaf switch 22(1) can include FIB/ADJ table 70(1), a network interface module 102, a memory element 104 that includes a database 106, a processor 108, and an aging module 110.

Network interface module 102 may include suitable interfaces (for example, line cards and/or ports) for receiving and/or transmitting data. In various embodiments, suitable interfaces for Ethernet and other kinds of network interfaces, control, monitoring and data logging, and other features to enable border leaf switch 22(1) to receive packet(s) 100 from a source, and forward packet(s) 100 to a destination. Packet(s) 100 may include a payload, which may include data and other content to be transferred from the source to the destination, and a header, which may include information pertaining to the packet's source (e.g., SIP), destination (e.g., DIP), VLAN, and/or other information necessary for routing packet(s) 100.

Memory 104 can store various applications, modules, and data for execution and use by processor 108. As shown in FIG. 5, memory 104 includes database 106 and a packet processing module (not shown). Database 106 can be used to populate FIB/ADJ table 70(1), for example, routing information provided in database 106 can be selectively inserted (for example, by packet processing logic) in FIB/ADJ table 70(1). In various embodiments, database 106 includes a routing information base (RIB) table (also referred to as a routing table or protocol database) that is constructed and updated by routing protocols. RIB table can be implemented as a software cache. In some embodiments, database 106 may also be an overlay network database (e.g., OTV database), a link state database (LSDB), or other database that may also be used to populate the RIB table. In various embodiments, database 106 is implemented in software, while FIB/ADJ table 70(1) is implemented in hardware. Database 106 and FIB/ADJ table 70(1) may be constructed as lookup tables or any other database. As used herein, the term "lookup" may refer to any type of search in a database. Memory 104 may comprise any number and type of storage components. In some embodiments, FIB/ADJ table 70(1) may be implemented in memory 104. In some embodiments, FIB/ADJ table 70(1) may be stored separately (e.g., in other memory elements) and accessed as needed based on particular switch configurations. Since only routes for active conversations (i.e., packets transmitted between hosts 14 and/or external hosts 16) are installed from database 106 to FIB/ADJ table 70(1), size requirements for FIB/ADJ table 70(1) can be significantly reduced.

As described herein, in operation, upon receiving a routing advertisement that includes a special tag, such as a community attribute, border leaf switch 22(1) can install routing information associated with the routing advertisement with a corresponding glean adjacency. In various embodiments, upon receiving a subnet advertisement including a community attribute, border leaf switch 22(1) installs a subnet route with a corresponding glean adjacency in FIB/ADJ table 70(1). Then, when border leaf switch 22(1) receives packet(s) 100 from external network 16 destined for a specific host 14 connected to network 12, a lookup may be performed in FIB/ADJ table 70(1) to find an entry associated with the specific host, for example, a host entry specifying an IP address for the specific host. If such a host entry is not present, then a look up may be performed in FIB/ADJ table 70(1) for the subnet route associated with the specific host, which indicates the corresponding glean adjacency. The glean adjacency will trigger software, such as database 106 (e.g., RIB table) to install routing information for the specific host (e.g., a host entry) in FIB/ADJ table 70(1), which can include the IP address of the specific host with an adjacency that indicates its corresponding leaf switch 20. Packet(s) 100 may than be forwarded (for example, unicast or multicast) via fabric spine 24 to the leaf switch 20 corresponding with the specific host.

Aging module 110 can periodically age out inactive entries in routing tables associated with border leaf switch 22(1), such as FIB/ADJ table 70(1), according to an aging criterion. Aging criteria can ensure that inactive host entries will age out and removed from FIB/ADJ table 70(1) accordingly. In some embodiments, aging criterion may be a predetermined time (e.g., 5 minutes, 30 minutes, etc.). In some embodiments, aging criterion may be a predetermined threshold level of free space allocated to FIB/ADJ table 70(1). For example, aging module 110 may age out inactive entries in FIB/ADJ table 70(1) when free space for storing new entries is below a predetermined threshold (e.g., 10%). Aging module 110 can operate in software (e.g., software application may run suitable processes in the operating system); in other embodiments, aging module 100 may operate in hardware (e.g., instructions may be stored in memory and may be executed periodically as needed).

Note that the functionalities described herein can be applied to enable automatic conversational learning on any network element and/or component in a communications environment to optimize traffic forwarding. Such functionalities are not limited to the network environments and/or the component/network elements described herein, such as border leaf switches 22. Enabling automatic conversational learning on border leaf switches 22 is simply one example. Moreover, the system and methods described herein may be applicable to any switch, irrespective of the particular type of switch (e.g., leaf switch, spine switch, access switch, aggregation switch, etc.).

Figure 6:
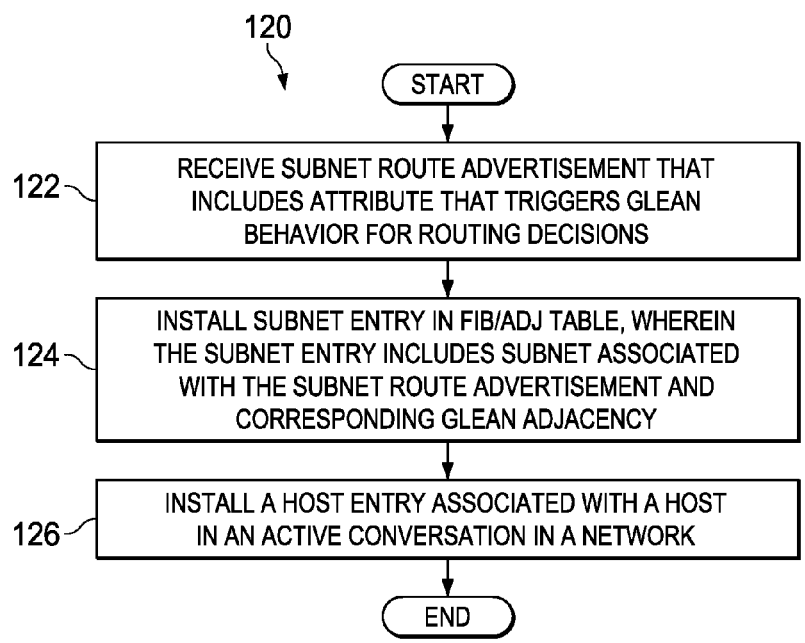
FIG. 6 is a simplified flow diagram illustrating example operations that can be associated with an embodiment of the communication system.

Turning to FIG. 6, FIG. 6 is a simplified flow diagram illustrating example operations 120 that may be associated with embodiments of communication system 10. Operations 120 may include 122, where a subnet route advertisement is received that includes an attribute that triggers glean behavior for routing decisions. For example, a border leaf switch receives a subnet route advertisement from a leaf switch 20. The subnet route advertisement can specify a subnet route and an extended community attribute for triggering glean behavior. At 124, a subnet entry is installed in a Forwarding Information Base/Adjacency (FIB/ADJ) table. The subnet entry can include a subnet associated with the subnet route advertisement and a corresponding glean adjacency. At 126, a host entry associated with a host in an active conversation in a network can be installed. The corresponding glean adjacency can trigger installation of the host entry. For example, border leaf switch 22 can receive a packet for forwarding to a destination host, determine that a subnet associated with the packet matches the subnet of the subnet entry in the FIB/ADJ table, which has the corresponding glean adjacency, triggering the border leaf switch to install that host entry for the destination host to the FIB/ADJ table. Border leaf switch 22 can then forward the packet to the destination host.

In example implementations, at least some portions of the activities outlined herein may be implemented in software in, for example, leaf switches 20, border leaf switches 22, and/or fabric spine 24. In some embodiments, one or more of these features may be implemented in hardware, provided external to these elements, or consolidated in any appropriate manner to achieve the intended functionality. Various network elements described herein (for example, leaf switches 20, border leaf switches 22, and/or fabric spine 24) may include software (or reciprocating software) that can coordinate in order to achieve the operations as outlined herein. In still other embodiments, these elements may include any suitable algorithms, hardware, software, components, modules, interfaces, or objects that facilitate the operations thereof Furthermore, leaf switches 20, border leaf switches 22, and/or fabric spine 24 described and shown herein (and/or associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities.

In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, a processor can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof In operation, components in communication system 10 can include one or more memory elements for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described herein should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", "various implementations" and the like are intended to mean that any such features are included in one or more embodiments of the present disclosure, but may or may not necessarily be combined in the same embodiments.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of the communication system 10 as described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a subnet route advertisement that includes an attribute that triggers glean behavior for routing decisions; and
installing a subnet entry in a Forwarding Information Base/Adjacency (FIB/ADJ) table, wherein the subnet entry includes a subnet associated with the subnet route advertisement and a corresponding glean adjacency.

2. The method of claim 1, further comprising:
receiving a packet for a destination host associated with a particular subnet;
upon determining that the particular subnet matches the subnet of the subnet entry in the FIB/ADJ table, installing a host entry for the destination host to the FIB/ADJ table, wherein the host entry includes a host IP address of the destination host and a corresponding adjacency to a network element anchoring the destination host to the network; and
forwarding the packet to the destination host.

3. The method of claim 2, further comprising forwarding the packet such that the packet traverses the network via a one-hop route.

4. The method of claim 2, wherein the packet is received from an external host.

5. The method of claim 1, wherein the route advertisement is a direct subnet connection redistributed into a routing protocol having the attribute attached thereto.

6. The method of claim 5, wherein the routing protocol is internal border gateway protocol (iBGP) and the attribute is an extended community attribute.

7. The method of claim 1, further comprising forwarding a packet between a host connected to the network and an external host connected to the network over an external network such that the packet traverses the network via a one-hop route.

8. The method of claim 1, wherein the network includes a leaf switch for connecting a host to the network and a border leaf switch that connects an external host to the network over an external network, and further wherein the border leaf switch receives the subnet advertisement from the leaf switch and installs the subnet entry in the FIB/ADJ table.

9. The method of claim 8, wherein the border leaf switch includes the FIB/ADJ table and a routing information base (RIB) table, and the border leaf switch triggers the RIB table to install the host entry in the FIB table.

10. One or more non-transitory tangible media having encoded thereon logic that includes instructions for execution and when executed by a processor, is operable to perform operations comprising:
    receiving a subnet route advertisement that includes an attribute that triggers glean behavior for routing decisions; and
    installing a subnet entry in a Forwarding Information Base/Adjacency (FIB/ADJ) table, wherein the subnet entry includes a subnet associated with the subnet route advertisement and a corresponding glean adjacency.

11. The media of claim 10, the operations further comprising:
    receiving a packet for a destination host associated with a particular subnet;
    upon determining that the particular subnet matches the subnet of the subnet entry in the FIB/ADJ table, installing a host entry for the destination host to the FIB/ADJ table, wherein the host entry includes a host IP address of the destination host and a corresponding adjacency to a network element anchoring the destination host to the network; and
    forwarding the packet to the destination host.

12. The media of claim 10, the operations further comprising forwarding a packet between a host connected to the network and an external host connected to the network over an external network such that the packet traverses the network via a one-hop route.

13. The media of claim 10, wherein the route advertisement is a direct subnet connection redistributed into a routing protocol having the attribute attached thereto.

14. An apparatus comprising:
    a memory element for storing data; and
    a processor operable to execute instructions associated with the date, wherein the processor and the memory element cooperate such that the apparatus is configured for:
    receiving a subnet route advertisement that includes an attribute that triggers glean behavior for routing decisions; and
    installing a subnet entry in a Forwarding Information Base/Adjacency (FIB/ADJ) table, wherein the subnet entry includes a subnet associated with the subnet route advertisement and a corresponding glean adjacency.

15. The apparatus of claim 14, wherein the apparatus is further configured for:
    receiving a packet for a destination host associated with a particular subnet;
    upon determining that the particular subnet matches the subnet of the subnet entry in the FIB/ADJ table, installing a host entry for the destination host to the FIB/ADJ table, wherein the host entry includes a host IP address of the destination host and a corresponding adjacency to a network element anchoring the destination host to the network; and
    forwarding the packet to the destination host.

16. The apparatus of claim 14, wherein the route advertisement is a direct subnet connection redistributed into a routing protocol having the attribute attached thereto.

17. The apparatus of claim 14, the apparatus further configured for forwarding a packet between a host connected to the network and an external host connected to the network over an external network such that the packet traverses the network via a one-hop route.

* * * * *